United States Patent Office 3,553,252
Patented Jan. 5, 1971

3,553,252
ESTERS OF ARYLOXYACRYLIC ACID
Akihiko Mine, Minoo-shi, Naganori Hino, Toyonaka-shi, Akira Fujinami, Takarazuka-shi, Katsuji Nodera, Nishinomiya-shi, Fukashi Horiuchi, Takarazuka-shi, and Yoshihiko Nishizawa, Nara-shi, Japan, assignors to Sumitomo Chemical Company, Ltd., Osaka, Japan, a corporation of Japan
No Drawing. Filed Oct. 23, 1967, Ser. No. 677,017
Claims priority, application Japan, Oct. 27, 1966, 41/71,144; Feb. 25, 1967, 42/12,158
Int. Cl. C07c 69/76; A01n 9/24
U.S. Cl. 260—473                                 1 Claim

ABSTRACT OF THE DISCLOSURE

Novel esters of aryloxyacrylic acids as plant growth-regulating agents having selectivity among plants, particularly narrow-leaved plants. These compounds have the general formula:

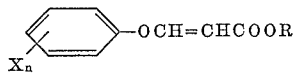

wherein X is the same or different halogen atoms and lower alkyl radicals; $n$ is an integer of 1 to 4; and R is cycloalkyl radical of from 5 to 7 carbon atoms, which may have a methyl radical on the ring, or R is benzyl radical which may have one or more halogen atoms or methyl radicals as substituents.

DISCLOSURE OF THE INVENTION

This invention relates to novel plant growth-regulating agents and, more particularly, to derivatives of aryloxyacrylic acids as plant growth-regulating agents.

That plant growth-regulating agents have been utilized not only as growth-regulating agents for crops but also as useful agricultural herbicides is well known without raising the examples of halogenated phenoxy saturated fatty acids. In the case of rice crop, which is one of the main agricultural products, there has been provided no satisfactory herbicide having effect on narrow-leaved weeds, particularly millet (*Echinochloa crus-galli*). 2,4-dichlorophenoxyacetic acid (hereinafter referred to as "2,4-D"), which is one of the above-mentioned halogenated phenoxy saturated acids, has been widely used as a herbicide. However, 2,4-D has, in practice, such demerit that it is less effective to millet than to broad-leaved weeds. Pentachlorophenol (hereinafter referred to as "PCP"), which is used at present for the prevention and eradication of millet in paddy fields, not only has markedly strong fish poison but sometimes shows phytotoxicity on rice plants depending on the time of application and on the nature of soil of paddy field. This is a great defect in application of PCP. Further, as a herbicide having selectivity among plants belonging to the grass family (Gramineae) there has heretofore been 3',4'-dichloropropionanilide (hereinafter referred to as "propanil"). It has, however, been known the propanil is effective only when sprayed to stems or leaves, and that the chemical is greatly reduced in effectiveness when used for soil treatment and hence is not practically usable. Therefore, in case propanil is to be used for the prevention and eradication of millet in a paddy field, water in the field should be removed to dry, prior to application of the chemical, the weeds at portions above the ground, so that the chemical can be adhered thereto. This not only requires much labor but also makes it difficult to use the chemical in districts where water tends to come short.

One object of the present invention is to provide herbicides which, in the prevention and eradication of narrow-leaved plants injurious to agriculture particularly to rice cultivation, show more excellent activity than 2,4-D, are less in fish poison and phytotoxicity on rice plants than PCP, are high in herbicidal selectivity among narrow-leaved plants, and are usable for soil treatment without removing water from paddy fields, unlike the case where propanil is used.

Other objects will be apparent from the following description.

In accordance with the present invention, there are provided plant growth-regulating agents containing as an active ingredient at least one derivative of aryloxyacrylic acids represented by the general formula

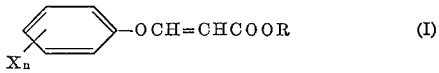         (I)

wherein X is the same or different halogen atoms and lower alkyl radicals; $n$ is an integer of 1 to 4; and R is cycloalkyl radical of from 5 to 7 carbon atoms, which may have a methyl radical on the ring, or R is benzyl radical which may have one or more halogen atoms or methyl radicals as substituents.

Among the aryloxyacrylates of the present invention, there exist two kinds of geometrical isomers. It is, however, needless to say that all the isomers represented by the plane structural formula indicated by the above-mentioned general Formula I are involved in the scope of the present invention.

The present inventors continued various studies on aryloxyacrylic acids and derivatives thereof to find that these compounds have growth-regulating actions on plants, like chlorinated phenoxyacetic acids.

2,4-D, which is a chlorinated phenoxyacetic acid, has been used as a herbicide, in practice. When used in a practical amount, however, 2,4-D is not so strong in effectiveness towards millet, which is greatly injurious to the rice crop, one of the most important agricultural products, as compared with the case where it is applied to broad-leaved weeds. This is a defect of 2,4-D in actual application. The inventors found that in contrast to 2,4-D, the aryloxyacrylic acids and derivatives thereof provided in accordance with the present invention are far more effective to narrow-leaved weeds, particularly millet, rather than to broad-leaved weeds.

Based on the above finding, the inventors made further studies to discover that some esters of aryloxyacrylic acids represented by the general Formula I have growth-regulating effects on plants and, when applied in suitable amounts at a proper time, they disturb the normal physiological actions of plant bodies to inhibit or promote the growth of plants.

The physiological characteristics of the present compounds with respect to plants are such that they differ in nature and extent of displayed actions depending on their amounts (concentrations), are stronger in growth inhibiting action rather than in growth promoting action, and act relatively weakly on broad-leaved plants but strongly on plants of the grass family. More surprisingly, they are weak in effectiveness to rice plants among the plants of the grass family but are extremely strong to millet (*Echinochloa crus-galli*), crab grass (*Digitaria sanguinalis*) and dent foxtail (*Setaria viridis*) and so on.

Further, the present compounds are expected to be utilized for the prevention of falling of rice plants, the control culture or over growth prevention of agricultural products, for intensive or control culture of vegetables; for the prevention of overgrowth of lawns.

The present compounds have the selectivity among plants of the grass family. In view of such selectivity characteristic, the present compounds are utilizable as herbicides. It can therefore be said that the present invention is markedly valuable and useful for agriculture. The present compounds are extremely excellent also in that they are much weaker in fish poison than PCP and hence are usable for the prevention and eradication of millet without any fear of phytotoxicity on rice plants. The present compounds are effectively used also for the treatment to soil of a paddy field and can be applied without removing water from the field, with the result that not only the labor required for the removal of water can be omitted but also water can be saved. Thus, the present compounds can be said to be markedly excellent herbicides as compared with propanil. Further, the present compounds display strong herbicidal actions even when used for the treatment of stems and leaves, and therefore it is needless to say that they can be successfully applied, like in the case of propanil, to the stems or leaves of weeds in a rice nursery or paddy field.

Recently, there is seen a marked tendency to minimize the labor required for agriculture. As one example thereof, the direct sowing and culture of rice have been examined and practiced. In the practice of direct-sowing cultivation of rice, the difficulty in the prevention and the eradication is encountered as a serious issue, and this has become a major cause for hindering the propagation of direct-sowing cultivation. The chemicals available at present such as, for example, PCP, 2,4-D and MCP (4-chloro-2-methyl-phenoxyacetic acid), are too strong in phytotoxicity on rice plants to be used for such direct sowing and culture, and propanil is too weak in effectiveness to be used for soil treatment.

However, the derivatives of aryloxyacrylic acids in accordance with the present invention can prevent and eradicate such weeds as millet (*Echinochloa crus-galli*), spikerush (*Eleocharis acicularis*), false pimpernal (*Lindernia pyxidaria*) and *Rotala indicia Koehne*, without any phytotoxicity on rice plants, even when applied before the germination thereof. Thus, in this field also, they can be said to be excellent herbicides. Further, they not only can be used as herbicides for the culture of rice plants, but also are usable as those for vegetables, root-crops, cereals, flowing plants, grasses grown in orchards and forests, and have marked effects particularly on weeds of the grass family such as barnyard grass (*Echinochloa crus-galli*), crab grass (*Digitaria sanguinalis*), dent foxtail (*Alopecurus aequalis*), green foxtail (*Setaria viridis*) and so on.

The aryloxyacrylates of the present invention are novel compounds, and it is the present inventors that have first found the useful and important properties and characteristics thereof.

The present compounds are prepared according to the following general procedure.

1.1 mole of a phenol compound and 1.0 g. of N-methylmorpholine are dissolved in 500 ml. of benzene and refluxed. And then 1.0 mole of propiolic acid ester is slowly added thereto. And the mixture is refluxed for 6 hours. After the reaction is over, benzene layer is washed with 5% sodium hydroxide aqueous solution and with water. And then benzene is removed by distillation, whereby objective substituted acrylic acid ester is obtained in pure form and in high yield.

According to the above general procedure the following compounds were obtained as shown in Table 1.

TABLE 1
Synthesized phenoxyacrylates

| No. of compounds | Phenols used | Propiolates used | Chemical structure | Physical properties | Yield percent | Analysis Calculated C H Cl Br | Analysis Found C H Cl Br |
|---|---|---|---|---|---|---|---|
| 1 | Cl-C6H4-OH (2-Cl) | HC≡CCOO-C6H5 (H) | C6H4(Cl)-OCH=CHCOO-C6H5 | $N_D^{26}$ 1.5432 | 95 | 64.17 6.10 17.10 | 64.29 5.96 17.27 |
| 2 | Br-C6H4-OH | Same as above | C6H4(Br)-OCH=CHCOO-C6H5 | $N_D^{26}$ 1.5555 | 95 | 55.40 5.27 | 55.67 5.10 |
| 3 | CH3,Cl-C6H3-OH | do | (CH3)(Cl)C6H3-OCH=CHCOO-C6H5 | M.P., 53–56° C. | 98 | 65.42 6.18 12.07 | 65.00 6.32 12.17 |
| 4 | Cl,Cl-C6H3-OH | do | (Cl)(Cl)C6H3-OCH=CHCOO-C6H5 | M.P., 62–64.5° C. | 92 | 57.34 4.81 22.57 | 57.35 4.98 22.54 |
| 5 | C(CH3)3,CH3-C6H3-OH | do | (C(CH3)3)(CH3)C6H3-OCH=CHCOO-C6H5 | $N_D^{20.5}$ 1.5270 | 94 | 75.91 8.92 | 75.92 9.01 |

TABLE 1—Continued

| No. of compounds | Phenols used | Propiolates used | Synthesized phenoxyacrylates | | | | | | | | | |
|---|---|---|---|---|---|---|---|---|---|---|---|---|
| | | | Chemical structure | Physical properties | Yield percent | Analysis | | | | | | |
| | | | | | | Calculated | | | Found | | | |
| | | | | | | C | H | Cl | Br | C | H | Cl | Br |
| 6 | 4-Cl, 2-Cl, 5-CH₃ phenol | HC≡CCOO-H | -OCH=CHCOO- (2-Cl, 5-CH₃, 4-Cl ring) H | $N_D^{20}$ 1.5549, B.P. 150° C., 0.2 | 95 | 57.16 | 5.12 | 22.50 | | 57.10 | 5.21 | 22.39 | |
| 7 | 2-Br, 4-CH₃ phenol | HC≡CCOO-H | -OCH=CHCOO- (2-Br, 4-CH₃ ring) H | $N_D^{20}$ 1.5565 | 90 | 57.80 | 5.99 | | 22.62 | 57.77 | 6.03 | | 23.08 |
| 8 | 2-Cl, 4-CH₃ phenol | HC≡CCOO-H | -OCH=CHCOO- (2-Cl, 4-CH₃ ring) H | M.P. 93.5–94.5° C. | 93 | 58.37 | 5.51 | 21.54 | | 58.32 | 5.54 | 21.62 | |
| 9 | 2-Br phenol | HC≡CCOO-H | -OCH=CHCOO- (2-Br ring) | $N_D^{20}$ 1.5560 | 83 | 56.65 | 5.65 | | 23.56 | 56.42 | 5.38 | | 23.48 |
| 10 | 4-Cl, 2-CH₃, 3-Cl phenol | Same as above | | $N_D^{20}$ 1.5570 | 98 | 59.48 | 5.87 | 20.66 | | 59.66 | 5.83 | 20.66 | |
| 11 | 2-Cl, 5-Cl phenol | do | -OCH=CHCOO- (2-Cl, 5-Cl ring) | $N_D^{20}$ 1.5445 | 90 | 57.34 | 4.81 | 22.57 | | 57.91 | 5.12 | 21.21 | |
| 12 | 2-Cl, 4-CH₃, CH₃ phenol | HC≡CCOOCH₂- (3-CH₃, CH₃ ring) | -OCH=CHCOOCH₂- (2-Cl, 4-CH₃, CH₃ ring)(3-CH₃, CH₃ ring) | $N_D^{18}$ 1.5817 | 97 | 61.55 | 4.59 | 20.19 | | 60.99 | 4.43 | 20.25 | |
| 13 | 2-F phenol | HC≡CCOOCH₂- (3-CH₃ ring) | -OCH=CHCOOCH₂- (2-F ring)(3-CH₃ ring) | $N_D^{20}$ 1.5380 | 94 | 71.32 | 5.28 | | | 70.98 | 5.29 | | |

TABLE 1—Continued

Synthesized phenoxyacrylates

| No. of compounds | Phenols used | Propiolates used | Chemical structure | Physical properties | Yield percent | Calculated C | Calculated H | Calculated Cl | Calculated Br | Found C | Found H | Found Cl | Found B |
|---|---|---|---|---|---|---|---|---|---|---|---|---|---|
| 14 | Cl-C₆H₃(Cl)-OH | HC≡CCOOCH₂-C₆H₅ | Cl-C₆H₃(Cl)-OCH=CHCOOCH₂-C₆H₅ | B.P. 200° C. 2.0, $N_D^{30}$ 1.5880 | 95 | 59.46 | 3.74 | 21.94 | | 59.09 | 3.64 | 22.05 | |
| 15 | Same as above | HC≡CCOOCH₂-C₆H₄(Cl) | Cl-C₆H₃(Cl)-OCH=CHCOOCH₂-C₆H₄(Cl) | M.P. 71–72° C. | 93 | 53.73 | 3.10 | 29.74 | | 53.84 | 3.13 | 29.73 | |
| 16 | do | HC≡CCOOCH₂-C₆H₃(Cl)(Cl) | Cl-C₆H₃(Cl)-OCH=CHCOOCH₂-C₆H₃(Cl)(Cl) | M.P. 65–66.5° C. | 98 | 45.06 | 2.13 | 41.56 | | 44.98 | 2.07 | 41.23 | |
| 17 | CH₃-C₆H₃(Cl)-OH | HC≡CCOOCH₂-C₆H₄(Cl) | CH₃-C₆H₃(Cl)-OCH=CHCOOCH₂-C₆H₄(Cl) | $N_D^{20.5}$ 1.5768 | 99 | 66.10 | 5.20 | 12.19 | | 66.23 | 5.03 | 11.96 | |
| 18 | Cl-C₆H₂(Cl)(Cl)-OH | HC≡CCOOCH₂-C₆H₂(Cl)(Cl)(Cl) | Cl-C₆H₂(Cl)(Cl)-OCH=CHCOOCH₂-C₆H₂(Cl)(Cl)(Cl) | M.P. 141.5–142.5° C | 86 | 38.79 | 1.42 | 50.10 | | 38.36 | 1.44 | 49.56 | |
| 19 | Cl-C₆H₃(Cl)-OH | HC≡CCOOCH₂-C₆H₃(Cl)(Cl) | Cl-C₆H₃(Cl)-OCH=CHCOOCH₂-C₆H₃(Cl)(Cl) | M.P. 115–116° C. | 98 | 45.06 | 2.13 | 41.56 | | 45.18 | 2.14 | 41.00 | |
| 20 | CH₃-C₆H₂(CH₃)(Cl)-OH | HC≡CCOOCH₂-C₆H₅ | CH₃-C₆H₂(CH₃)(Cl)-OCH=CHCOOCH₂-C₆H₅ | $N_D^{22.5}$ 1.5765 | 97 | 66.12 | 6.85 | 11.48 | | 66.25 | 6.72 | 11.46 | |

In actual application, the present compounds are desirably used in the form of emulsifiable concentrates or granular preparations. Depending on purposes, however, they may be in any form of the common agricultural chemicals such as dusts, wettable powders and the like. It is not objectionable at all to directly apply the original chemicals as such. In application, the emulsifiable concentrates or wettable powders are diluted with water and are then sprayed onto weeds or poured into soils, while dusts or granular preparations are applied as such, whereby the herbicidal object can be achieved. In the above case, the present compounds may be used in admixture with spreaders or the like surface active agents, employed for agricultural purposes to increase and ensure the herbicidal effects thereof. Further, they may be used in admixture with such agricultural chemicals as insecticides, fungicides and nematocides or with fertilizers. For use as herbicides, the present compounds are of course used independently, but they may also be used in combination with other herbicides.

The present invention will be illustrated further in detail below with reference to examples, but the kinds and mixing proportions of the compounds and additives are of course variable within wide scopes without being limited to those shown in the examples. In the examples, the names of compounds are represented by the numbers of compounds exemplified in Table 1.

Example 1

| | Parts |
|---|---|
| Compound (1) | 3 |
| Clay | 97 |

The above materials are thoroughly pulverized and mixed together to obtain a dust. In actual application, the dust is dusted as such.

Example 2

| | Parts |
|---|---|
| Compound (20) | 2 |
| Diatomaceous earth | 98 |

The above materials are thoroughly pulverized and mixed together to obtain a dust. In actual application, the dust is dusted as such.

Example 3

| | Parts |
|---|---|
| Compound (17) | 50 |
| Sorpol 2170 (registered trade name for a surface active agent produced by Toho Kagaku Co.) | 5 |
| Talc | 45 |

The above materials are thoroughly pulverized and mixed together to obtain a wettable powder. In actual application, the wettable powder is diluted with water and the resulting solution is sprayed.

Example 4

| | Parts |
|---|---|
| Compound (3) | 25 |
| Alscope LN-90 (registered trade name for an emulsifier produced by Toho Kagaku Co.) | 5 |
| Kaolin | 70 |

The above materials are thoroughly pulverized and mixed together to obtain a wettable powder. In actual application, the wettable powder is diluted with water and the resulting solution is sprayed.

Example 5

| | Parts |
|---|---|
| Compound (12) | 20 |
| Sorpol 213 (registered trade name for an emulsifier produced by Toho Kagaku Co.) | 20 |
| Dioxane | 60 |

The above materials are thoroughly mixed together to obtain an emulsifiable concentrate. In actual application, the emulsifiable concentrate is diluted with water and the resulting solution is sprayed.

Example 6

| | Parts |
|---|---|
| Compound (4) | 20 |
| Sorpol 2492 (registered trade name for an emulsifier produced by Toho Kagaku Co.) | 15 |
| Cyclohexanone | 65 |

The above materials are thoroughly mixed together to obtain an emulsifiable concentrate. In actual application, the emulsifiable concentrate is diluted with water and the resulting solution is sprayed.

Example 7

| | Parts |
|---|---|
| Compound (14) | 4 |
| Bentonite | 96 |

The above materials are thoroughly pulverized and mixed together, and the mixture is kneaded with water. The kneaded mixture is granulated and dried to obtain a granular preparation. In actual application, the granular preparation is sprinkled as such.

Example 8

| | Parts |
|---|---|
| Compound (7) | 3 |
| Clay | 95 |
| Toyolignin NP (registered trade name for a spreader produced by Toyo Boseki Co.) | 2 |

The above materials are thoroughly pulverized and mixed together, and the mixture is kneaded with water. The kneaded mixture is granulated and dried to obtain a granular preparation. In actual application, the granular preparation is sprinkled as such.

In order to substantiate the effectiveness of the present compounds, typical test results will be shown with reference to the following test examples:

Test Example 1.—Test chemicals diluted to various test concentrations were individually charged in a 9 cm. Petri dish in which had been placed absorbent cotton and a filter paper. On the filter paper, each 10 seeds of radish (*Raphanus sativus*), millet (*Echinochloa crus-galli*), and cucumber (*Cucumis sativus*) were individually sowed. Thereafter, the state of germination and rootage of the seeds were observed. The results were as shown in Table 2, in which the numerical values are the concentrations of chemicals which were effective to inhibit the germination and growth of the seeds.

TABLE 2.—EFFECTIVE CONCENTRATION FOR INHIBITING THE GERMINATION OF SEEDS
[Unit concentration: p.p.m.]

| Compound | Plant | | |
|---|---|---|---|
| | Radish | Millet | Cucumber |
| (1) | 500 | 1 | <500 |
| (2) | 500 | 2 | <500 |
| (3) | <500 | 1 | <500 |
| (4) | 200 | 1 | 500 |
| (5) | 500 | 500 | <500 |
| (6) | 500 | 200 | <500 |
| (7) | 500 | 500 | <500 |
| (8) | 500 | 2 | <500 |
| (9) | 500 | 2 | <500 |
| (10) | 500 | 500 | <500 |
| (11) | 200 | 2 | 500 |
| (12) | <500 | 2 | 500 |
| (13) | 500 | 1 | 500 |
| (14) | <500 | 1 | 500 |
| (15) | 500 | 20 | <500 |
| (16) | <500 | 20 | <500 |
| (17) | 200 | 5 | <500 |
| (18) | 500 | 500 | <500 |
| (19) | <500 | 500 | <500 |
| (20) | 500 | 200 | <500 |
| PCP | 50 | 50 | 20 |
| Propanil | 50 | 200 | 500 |

Test Example 2.—Wagner pots of 14 cm. in diameter were individually packed with 1.5 kg. of the soil of a paddy field. Into each pot, water was charged and the soil was thoroughly kneaded therewith. To the pots, rice seedlings at their 3-leaved stage and spikerush (*Eleocharis acicularis*) were transplant. Further, rice and millet seeds were sowed therein. Subsequently, the chemicals of Examples 3, 4, 5, 6, 7 and 8 were individually applied to the soil in the pots. After 25 days, the herbicidal effects of the preparations were investigated. Further, the herbicidal effects on such spontaneously grown broad-leaved weeds as *Lindera pyxidaria*, *Rotala indicia* and *Dopacorium junceum Hamilt* were also investigated. The results were as shown in Table 3. The evaluation of herbicidal effects was represented individually by the figures of 0 to 5 as shown below.

0—Equal to non-treatment
1—Growth slightly inhibited
2—Growth considerably inhibited
3—Growth greatly inhibited or plants partly died
4—Plants substantially died
5—Plants completely died

TABLE 3.—HYDRATED SOIL TREATMENT TEST

| Chemical | Amount applied (g./10 a.)[1] | Rice seedlings | Rice seeds | Millet | Spike-rush | Broad leaved weeds |
|---|---|---|---|---|---|---|
| Emulsifiable concentrate of Example 5 | 400 | 0 | 0 | 5 | 4 | 4 |
|  | 200 | 0 | 0 | 5 | 2 | 2 |
|  | 100 | 0 | 0 | 3 | 1 | 0 |
| Emulsifiable concentrate of Example 6 | 400 | 0 | 0 | 5 | 4 | 5 |
|  | 200 | 0 | 0 | 5 | 2 | 3 |
|  | 100 | 0 | 0 | 4 | 0 | 0 |
| Granular preparation of Example 7 | 400 | 0 | 0 | 5 | 4 | 4 |
|  | 200 | 0 | 0 | 5 | 3 | 4 |
|  | 100 | 0 | 0 | 5 | 1 | 3 |
| Granular preparation of Example 8 | 400 | 0 | 2 | 5 | 3 | 3 |
|  | 200 | 0 | 0 | 4 | 1 | 2 |
|  | 100 | 0 | 0 | 2 | 0 | 0 |
| Wettable powder of Example 3 | 400 | 0 | 0 | 5 | 4 | 4 |
|  | 200 | 0 | 0 | 5 | 2 | 3 |
|  | 100 | 0 | 0 | 5 | 0 | 1 |
| Wettable powder of Example 4 | 400 | 0 | 0 | 5 | 4 | 5 |
|  | 200 | 0 | 0 | 5 | 1 | 4 |
|  | 100 | 0 | 0 | 4 | 0 | 0 |
| PCP | 800 | 3 | 5 | 4 | 3 | 5 |
| DCPA | 800 | 0 | 0 | 0 | 0 | 0 |

[1] The amount applied represents the amount of active ingredient.

Test Example 3.—Seeds of radish (*Raphanus sativus*), cucumber (*Cucumis sativus*), rice (*Oryza sativa*) and millet (*Echinochloa crus-galli*) were sowed and grown in pots. When main leaves of the radish and cucumber had emerged and when the rice and millet had reached the 2-leaved stage, given amounts of the chemicals of Examples 1, 2, 3, 4, 5 and 6 were sprayed onto the stems and leaves of the plants. Subsequently, observation was continued and, after 25 days from the treatment, the final judgement was effected. The results were as shown in Table 4. The evaluation of herbicidal effects was represented by the figures of 0 to 5, like in Test Example 2.

We claim:
1. A compound of the formula:

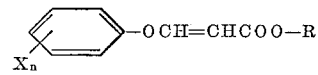

wherein X is the same or different halogen atoms and lower alkyl radicals; $n$ is an integer of 1 to 4; and R is cycloalkyl radical of from 5 to 7 carbon atoms, which may have a methyl radical on the ring, or R is benzyl

TABLE 4.—POST EMERGENCE TREATMENT TEST

| Chemical | Amount applied (g./10 a.)[1] | Radish | Millet | Cucumber | Rice |
|---|---|---|---|---|---|
| Dust of Example 1 | 400 | 5 | 5 | 2 | 0 |
|  | 200 | 4 | 5 | 0 | 0 |
| Dust of Example 2 | 400 | 2 | 4 | 0 | 0 |
|  | 200 | 0 | 2 | 0 | 0 |
| Wettable powder of Example 3 | 400 | 5 | 5 | 3 | 0 |
|  | 200 | 4 | 5 | 2 | 0 |
| Wettable powder of Example 4 | 400 | 5 | 5 | 3 | 0 |
|  | 200 | 4 | 5 | 1 | 0 |
| Emulsifiable concentrate of Example 5 | 400 | 4 | 5 | 3 | 1 |
|  | 200 | 1 | 4 | 1 | 0 |
| Emulsifiable concentrate of Example 6 | 400 | 5 | 5 | 5 | 0 |
|  | 200 | 5 | 5 | 3 | 0 |
| PCP | 400 | 5 | 3 | 5 | 5 |
|  | 200 | 3 | 1 | 3 | 3 |
| DCPA | 200 | 5 | 4 | 5 | 1 |

[1] The amount applied represents the amount of active ingredient.

Test Example 4.—The chemicals of Examples 3, 4, 5 and 6 were tested in the following manner:

When 2 main leaves had begun to emerge from tomato (*Lycopersicon esculentum*) seeds sowed in pots of 10 cm. in diameter, the test chemicals diluted to 1,000 times (based on active ingredient) were individually poured into the soil of each pot in an amount of 3 cc. per pot. After 14 days from the treatment, investigation was made to find that the number of leaves of the tomato plants was equal to the case where no treatment had been effected, but as to the weight and height of each plant, every chemical showed a growth retarding effect of 14–34% as compared with the case of non-treatment.

radical which may have one or more halogen atoms or methyl radicals as substituents.

References Cited
UNITED STATES PATENTS 2,765,224  10/1956  Lambrech _____ 260—473X LORRAINE A. WEINBERGER, Primary Examiner D. E. STENZEL, Assistant Examiner U.S. Cl. X.R.

71—108